United States Patent  [15] 3,680,952
Knowles  [45] Aug. 1, 1972

[54] APPARATUS FOR HANDLING IMAGE-BEARING MEDIUMS

[72] Inventor: Frederick G. Knowles, Rochester, N.Y.

[73] Assignee: Eastman Kodak Company, Rochester, N.Y.

[22] Filed: Aug. 3, 1970

[21] Appl. No.: 60,499

[52] U.S. Cl. .................................................353/27
[51] Int. Cl. ............................................G03b 23/08
[58] Field of Search..........353/25, 27, 74, 75, 76, 77, 353/78; 355/119

[56] References Cited

UNITED STATES PATENTS

| 3,320,854 | 5/1967 | Wally | 353/27 |
| 3,352,201 | 11/1967 | Brommscombe | 353/27 |
| 3,319,518 | 5/1967 | Carlson | 353/27 |

FOREIGN PATENTS OR APPLICATIONS

| 942,117 | 1/1949 | France | 353/27 |

Primary Examiner—Leonard Forman
Assistant Examiner—A. J. Mirabito
Attorney—Robert W. Hampton and John D. Husser

[57] ABSTRACT

A projected image viewer is adapted to receive and movably support a plate-like carrier which, in turn, can slidingly support a microfiche or similar multi-image-containing medium of the type having projectable images arranged in rows and columns. The carrier has an aperture across which rows of the images can be moved by sliding of a supported microfiche on the carrier in a first direction. The carrier and supported microfiche can be incrementally received in or withdrawn from the viewer in directions orthogonal to the first direction so that any image on a supported microfiche can be positioned for projection by movement of the microfiche on the carrier and movement of the carrier into and out of the viewer. A pair of opposed members, located on the carrier, are adjustable to support for movement in the first direction any one of a plurality of sizes of such type mediums. The carrier and the viewer have a plurality of detent elements which cooperate upon incremental receipt and/or withdrawal of the carrier for indicating alignment of an image row with the projection system of the viewer.

3 Claims, 6 Drawing Figures

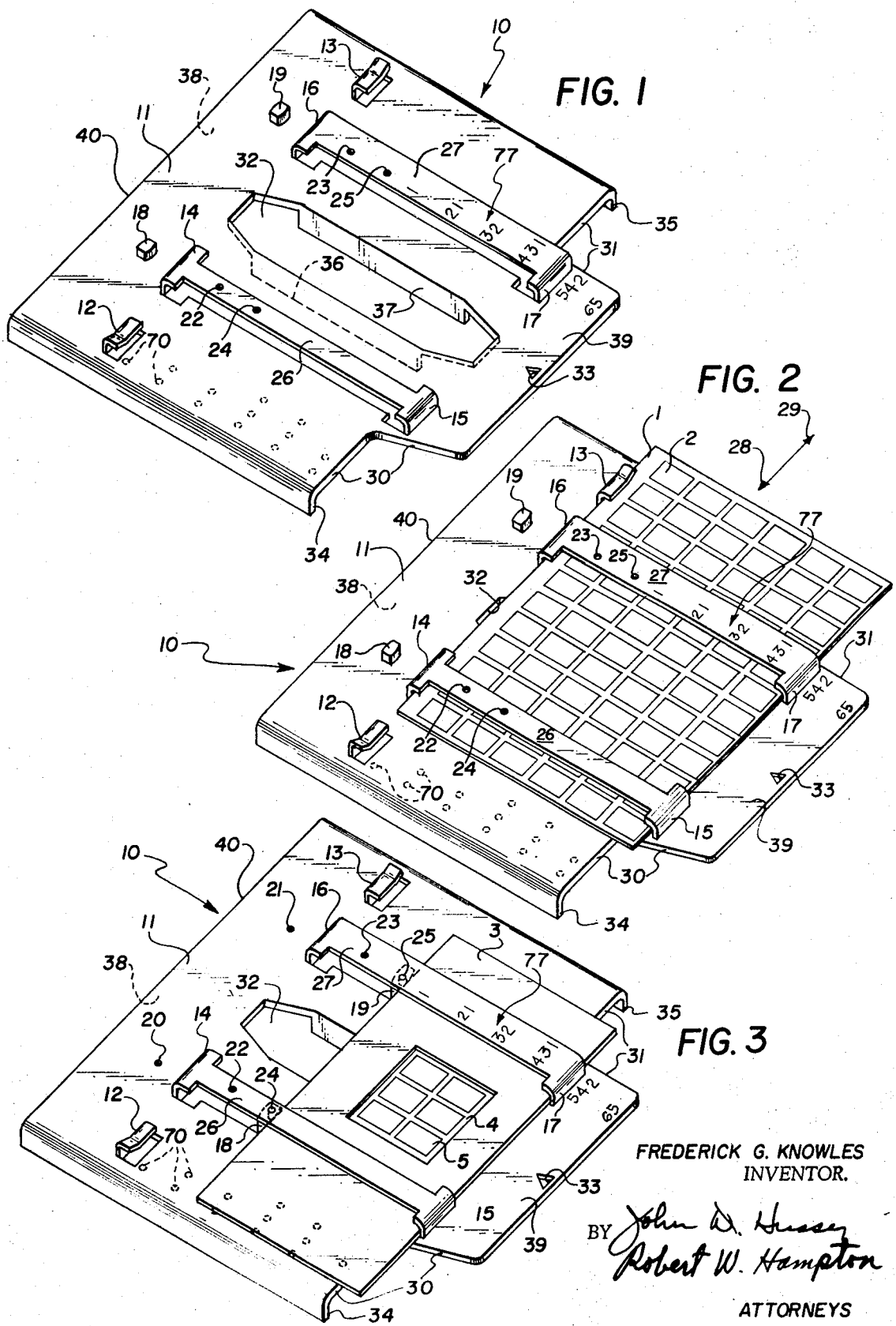

FREDERICK G. KNOWLES
INVENTOR.

BY John D. Huser
Robert W. Hampton
ATTORNEYS

FREDERICK G. KNOWLES
INVENTOR.

ATTORNEYS

APPARATUS FOR HANDLING IMAGE-BEARING MEDIUMS

BACKGROUND OF THE INVENTION

1. Field of the Invention

The present invention relates to apparatus useful in the handling of image-bearing sheets of film and the like for projection thereof, and more particularly to novel and improved apparatus by means of which a part of the total image or one image of a multi-image-bearing sheet of microfilm can be selectively positioned in a projector for viewing by an observer.

2. Description of the Prior Art

Microfilm records heretofore known primarily have been maintained in strip form on spools and read by threading the strip through the projection head of a microfilm reader or viewer having an optical system which casts an enlargement of the microfilm image onto a translucent screen or other surface for viewing by an observer. Rotation of the spools brings a desired part of the microfilm strip to the projection head where it is magnified by the optical system and projected on the screen in enlarged size for scanning at the viewer. Numerical, alphabetical or chronological indices are usually employed to facilitate convenient locating of a particular portion of such long, continuous strips. If it is desired to consider or compare two microfilm images which are on the same spooled strip with respect to each other, it is necessary to shift back and forth the length of the filmstrip separating them so that each image could be viewed in turn for comparison. Inasmuch as the intervening length of microfilm is not definitely known, such shifting would involve considerable hunting to locate the desired images.

A more recently devised microform, with which location of a desired image appears simplified in comparison to the steps necessary to find such an image on a spooled microfilm strip, comprises a flat rectangular microfilm sheet, or a flat assemblage of relatively short microfilm strips, of the type having a plurality of individually related images which are coordinately arranged with respect to each other by rows and columns of such images in a manner defining a rectangular image pattern. Microforms of this type are commonly referred to as microfiche or as having a microfiche format. Such flat microforms are commercially available as film sheets, and in aperture cards and acetate jackets, of various sizes.

The widely accepted commercial use of microforms of microfiche formats, i.e., with their images arranged by rows and columns, has resulted in a demand for apparatus usable with a reader or viewer to position for projection a particular one of the images on a given microform, while preventing projection of the remainder of images on such microform. Preferably, such apparatus would permit any one of the different sized microforms, when used therewith, to be moved easily by one hand from image to image within a particular row and to move from one selected row of images to another. Moreover, the apparatus should have an indexing mechanism for indicating positions of the microform within the reader or viewer at which respective ones of the images can be selectively projected.

SUMMARY OF THE INVENTION

Accordingly, it is a principle object of the present invention to provide novel and improved apparatus by means of which a part of the total image or one image of a multi-image-bearing medium, such as a microfiche, can be selectively positioned in a projector for viewing by an observer.

A further object of the present invention is to provide apparatus of the character described in the immediately preceding paragraph which is suitable for use with a plurality of image-bearing mediums, in microform or otherwise, that may respectively differ as to size, format and the number of projectable images.

Yet another object of the present invention is to provide apparatus, usable with a flat, multi-image-bearing medium of the type wherein the images are arranged with respect to each other by rows and columns thereof, for indicating when a predetermined image is selectively positioned for projection thereof in a reader or viewer.

In accordance with a preferred embodiment of the present invention there is provided a carrier which can slidingly support a microfiche or other multi-image-containing medium of the type having a projectable image arranged with respect to each other in rows and columns. Such a carrier has an aperture across which rows of the images can be moved by sliding a supported microfiche on the carrier in directions extending parallel to the image rows. When supporting the microfiche, the carrier is intended to be incrementally moved into or out of the projector by rows of the images, whereby any image on the supported microfiche can be selectively positioned for projection by sliding of the microfiche on the carrier and movement of the carrier as previously described. A pair of opposed members, located on the carrier, are adjustable to support for movement in the directions extending parallel to the image rows any one of a plurality of such type mediums that differ in size, format and as to the number of image rows. The carrier and the projector have a plurality of detent elements, cooperating upon incremental movement of the carrier in the projector, to indicate carrier positions respectively at which a different image row is correctly located for transversing the projection system in the projector. Moreover, a pointer is arranged on the carrier to indicate when an image in such a located row will be positioned for projection onto a viewing surface.

BRIEF DESCRIPTION OF THE DRAWINGS

The above-mentioned and other features and objects of the present invention and the manner of obtaining them will become more apparent by reference to the following detailed description of the preferred embodiment of the present invention taken in conjunction with the accompanying drawings wherein:

FIG. 1 is a perspective view of a carrier for a multi-image-containing microform in accordance with a preferred embodiment of the present invention;

FIG. 2 is a perspective view of the carrier supporting flatly thereon a multi-image-containing microform of the type having projectable images which are coordinately arranged with respect to each other by rows and columns of such images;

FIG. 3 is a perspective view of the carrier supporting flatly thereon a multi-image-containing microform which is of a format and size differing from the microform depicted in FIG. 2;

DESCRIPTION OF THE PREFERRED EMBODIMENT

Figure 4:
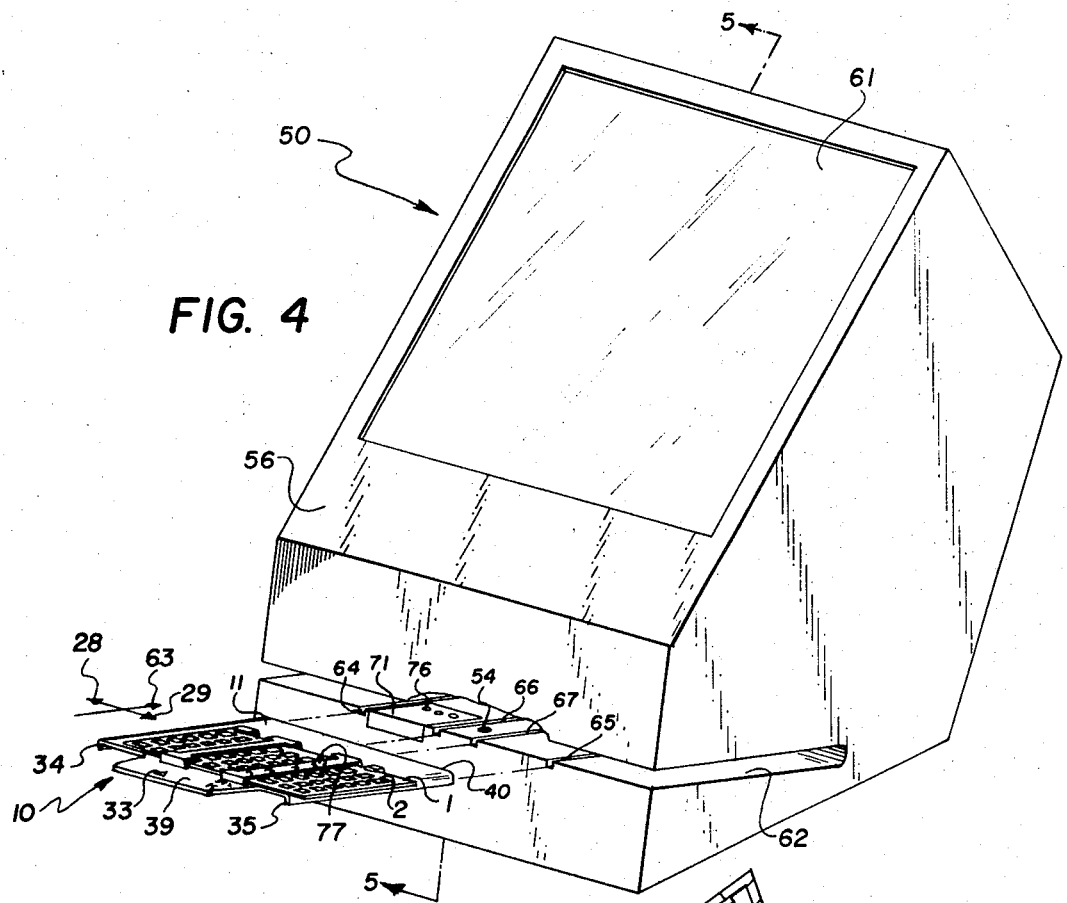
FIG. 4 is a perspective view of a projector and the carrier supporting the microform as depicted in FIG. 2, showing the manner in which the carrier and the microform are intended to be received by and withdrawn from the projector.

Referring now to the drawings and in particular to FIG. 1, there is shown a plate-like carrier or holder 10 which is generally adapted to support a flat, image-bearing medium of the type wherein a plurality of projectable images are coordinately arranged with respect to each other in a rectangular pattern by rows and columns of such images. For the purpose of illustration, the carrier is shown in FIG. 2 as supporting a multi-image-bearing microfiche sheet 1 of which the microimages 2 can be projected and enlarged for viewing. However, it will be appreciated that the carrier is equally suited for use with other image-bearing mediums having a microfiche or other format, such as single or multi-image-bearing film strips which are arranged parallel with respect to each other in a transparent jacket, aperture cards on which is mounted a film sheet bearing a plurality of images arranged either in a single row or two or more parallel extending rows, and the like.

As can be seen in FIG. 2, the carrier 10 is provided on its workface 11 with spaced tab members 12 and 13 and interconnected pairs of opposed tab members 14, 15 and 16, 17 which are positioned with respect to each other for holding, flatly on the carrier workface, the microfiche sheet 1. Such a carrier, as stated hereinbefore, can be adapted to support multi-image-bearing mediums other than the microfiche sheet 1. For example, with reference to FIG. 3, there is shown flatly held on the carrier workface an aperture card 3 which includes a multi-image-bearing microfiche sheet 4. In order to support a plurality of image-bearing mediums, such as the aperture card 3, which are smaller than mediums the size of the microfiche sheet 1, the carrier has removably mounted thereon another pair of tab members 18 and 19. Such tab members 18 and 19, although normally inserted in the carrier holes 20 and 21 as shown by FIG. 1, can be individually inserted in the holes 22, 23, 24 and 25, see FIG. 3. Accordingly, the tab members 18 and 19 are adjustable to any one of a plurality of positions on the carrier workface for respectively holding different sized microfilm or other image-bearing mediums. However, it should be understood that while the number of holes 22–25 in the tab interconnecting members 26 and 27 has been shown and described as four, such number can be increased or decreased in accordance with the present invention for the purpose of varying the capacity of the carrier to accommodate diverse forms of microfilm and other image-bearing mediums.

Although the multi-image-bearing mediums as respectively shown in FIGS. 2 and 3 have been end-loaded in the carrier 10, it will be appreciated that such carrier can be modified within the scope of the present invention whereby other medium-loading procedures may be utilized. For example, if the tab interconnecting members 26 and 27 were removed without disturbing the presence of the tab members 14–17, then the multi-image-bearing mediums could be top-loaded in the carrier. Of course, if such a modification of the carrier were to be utilized, then the holes 22–25 would preferably be formed in the carrier workface 11.

Hereinafter, for the purpose of simplicity of description, the carrier 10 will be described with reference to an application thereof wherein the microfiche sheet 1 is used. However, it will be understood that such application is by way of example only, and the carrier is suited for use with any flat, multi-image-bearing medium which is of the type described above.

When supported flatly on the carrier workface 11 by the tab members 12–17 as shown in FIG. 2, the microfiche sheet 1 can be slidingly moved back and forth along such workface in opposite directions which extend parallel to the rows of microimages 2 and are respectively designated by the arrows 28 and 29. To facilitate such sliding movement of the supported microfiche 1, the carrier 10 is provided with angularly disposed edges 30 and 31, whereby the microfiche sheet can be easily grasped by one's hand and moved in either of the opposite directions. Accordingly, it can be seen that the microfiche sheet 1, when held on the carrier workface by the tab members 12–17, can be slidingly moved in a manner such that each of the microimages 2 which make up any one of the parallel extending rows thereof will respectively traverse, one image at a time, a centrally located carrier aperture 32. That is to say, as the supported microfiche sheet is moved in either of the opposite directions, one column of microimages at a time will be longitudinally positioned over the carrier aperture as shown by FIG. 2. And in order to indicate when a column of images on the supported microfiche sheet is so positioned over the carrier aperture, a pointer 33 is provided on the carrier workface at a location adjacent such aperture.

Figure 5:
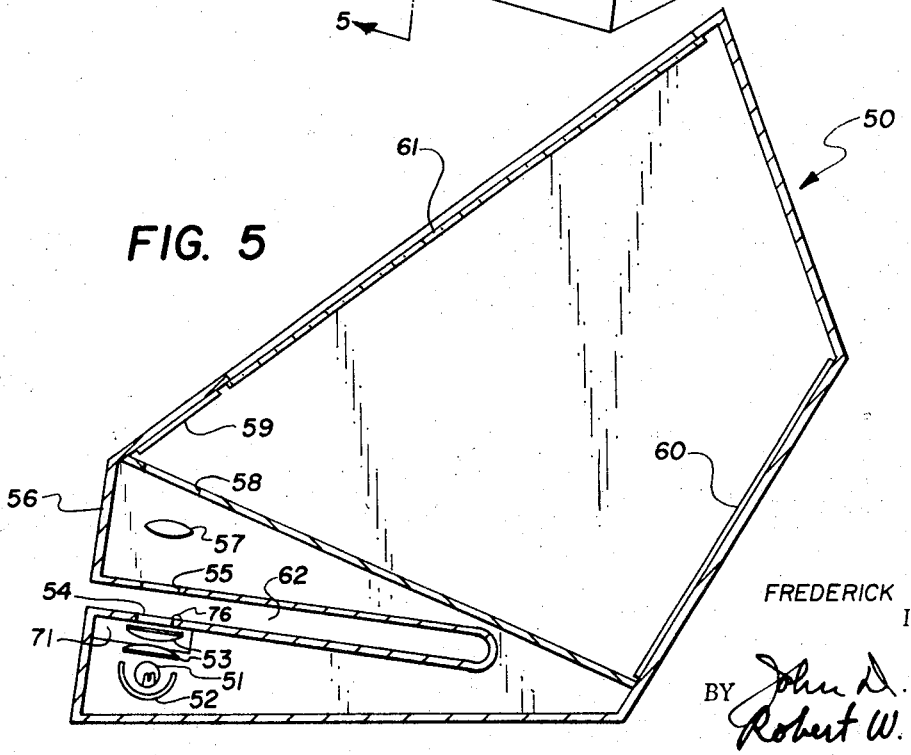
FIG. 5 is a cross-sectional view of the projector taken along the line 5—5 of FIG. 4.

Referring now in particular to FIGS. 4 and 5, there is shown a projector 50 which can project for viewing in enlarged size a selected one of the microimages 2 contained on the microfiche sheet 1. The projector is in the form of a reader or viewer and comprises a light source 51 from which a light beam (not shown) is directed by a reflector 52 successively through a condensor lens assemblage 53, opposed holes 54 and 55 in the projector housing 56, and a projection lens 57. After passing through the projection lens 57, the light beam enters another hole 58 in the projector housing, whereupon such beam is directed by way of a folded light path induced by the mirrors 59 and 60 onto a display surface which is the viewing screen 61. Accordingly, should a strip of film having an image thereon, such as the image-containing microfiche sheet 1, be positioned in the projector inlet 62 between the holes 54 and 55 so as to traverse a light beam emanating from the light source 51, such film image will be projected and enlarged to a size sufficient for direct reading on the screen 61.

The projector 50 is adapted for slidingly receiving at its inlet 62, in the manner shown by FIG. 4, the carrier 10 with the microfiche sheet 1. As will be explained hereinafter in detail, the carrier with the microfiche sheet (or some other multi-image-bearing medium of the type described above) is intended to be incrementally received by the projector, one row of the microimages 2 at a time, in a direction which is generally designated by the arrow 63. Such direction is orthogonal to the opposite directions respectively designated by the arrows 28 and 29.

To facilitate sliding incremental receipt of the carrier 10 and the microfiche sheet 1 by the projector 50 as shown in FIG. 4, there is provided on the carrier underface 38 a pair of parallel extending carrier edge guide rails 34 and 35 and a pair of parallel extending carrier aperture guide rails 36 and 37 (FIG. 1) which respectively mate with parallel extending channels 64, 66, 67, and 65, cut in the projector housing 56 at the projector inlet 62, upon insertion of the carrier in such inlet. Preferably, a handle 39 extending from the carrier may be used to facilitate varying the degree of insertion of such carrier in the projector inlet.

When the carrier 10 with the microfiche sheet 1 is received in the projector 50, the light beam emanating from the projector light source 51 may be directed through the carrier aperture 32 so that a predetermined one of the microimages 2 in a selected row of such images is displayed on the projector screen 61 for viewing by an observer, see FIGS. 4 and 5. Each of the microimages comprising the selected row thereof can be successively positioned between the holes 54 and 55 in the projector housing 56, so as to extend across the path of the light beam, upon sliding movement of the carrier supported microfiche sheet along the carrier workface 11 in either of the opposite directions respectively designated by the arrows 28 and 29. Furthermore, as the carrier and the microfiche sheet can be incrementally received, row by row of the microimages, in the projector inlet 62, the microfiche sheet with the carrier can be moved past the holes 54 and 55 whereby one selected row of images after another will respectively be aligned, i.e., in the correct relative position, to traverse the light beam.

Referring now to FIGS. 1–3, it can be seen that the carrier 10 is provided on its undersurface 38 with a plurality of spaced recesses 70 which are arranged in columns thereof extending substantially parallel to the carrier guide rails 34–37. Such columns of recesses are further arranged to extend substantially parallel to the columns of projectable images on a particular microform supported in the manner of the plurality shown by FIGS. 2 and 3. In accordance with the present invention, the number of columns of recesses on a carrier should be equal to the number of different sized multi-image-bearing mediums which such carrier is adapted to separately support. For example, in the illustrated carrier embodiment, the number of columns of recesses 70 on the underface 38 of the carrier 10 is equal to three as such carrier is designed to separately support three different sized microforms, namely, the microfiche sheet 1 (FIG. 2), the aperture card 3 (FIG. 3) and a transparent multi-image-containing jacket (not shown). Further in accordance with the present invention, the different numbers of recesses which make up each of the several recess-defined columns on a carrier should be respectively equal to the different numbers of rows of projectable images on each of plurality of various sized multi-image bearing mediums which such carrier is adapted to separately support. For example, in the illustrated carrier embodiment, the different numbers of the recesses 70 which make up each of the three columns thereof on the carrier 10 are respectively equal to six, five and two as such carrier is designed to separately support the microfiche sheet 1 having six rows of the images 2 (FIG. 2), the transparent multi-image-containing jacket having five rows of images (not shown), and the aperture card 3 having three rows of the images 5 (FIG. 3). Accordingly, the number of recesses comprising a particular one of the recess-defined columns on such a carrier will be equal to the number of rows of projectable images on one of the plurality of different sized image-bearing mediums which the carrier is adapted to separately support. Moreover, it will be appreciated that the spacing between the recesses of the several recess-defined columns can be varied to accommodate different sized images on the same or different sized image-bearing mediums.

Figure 6:
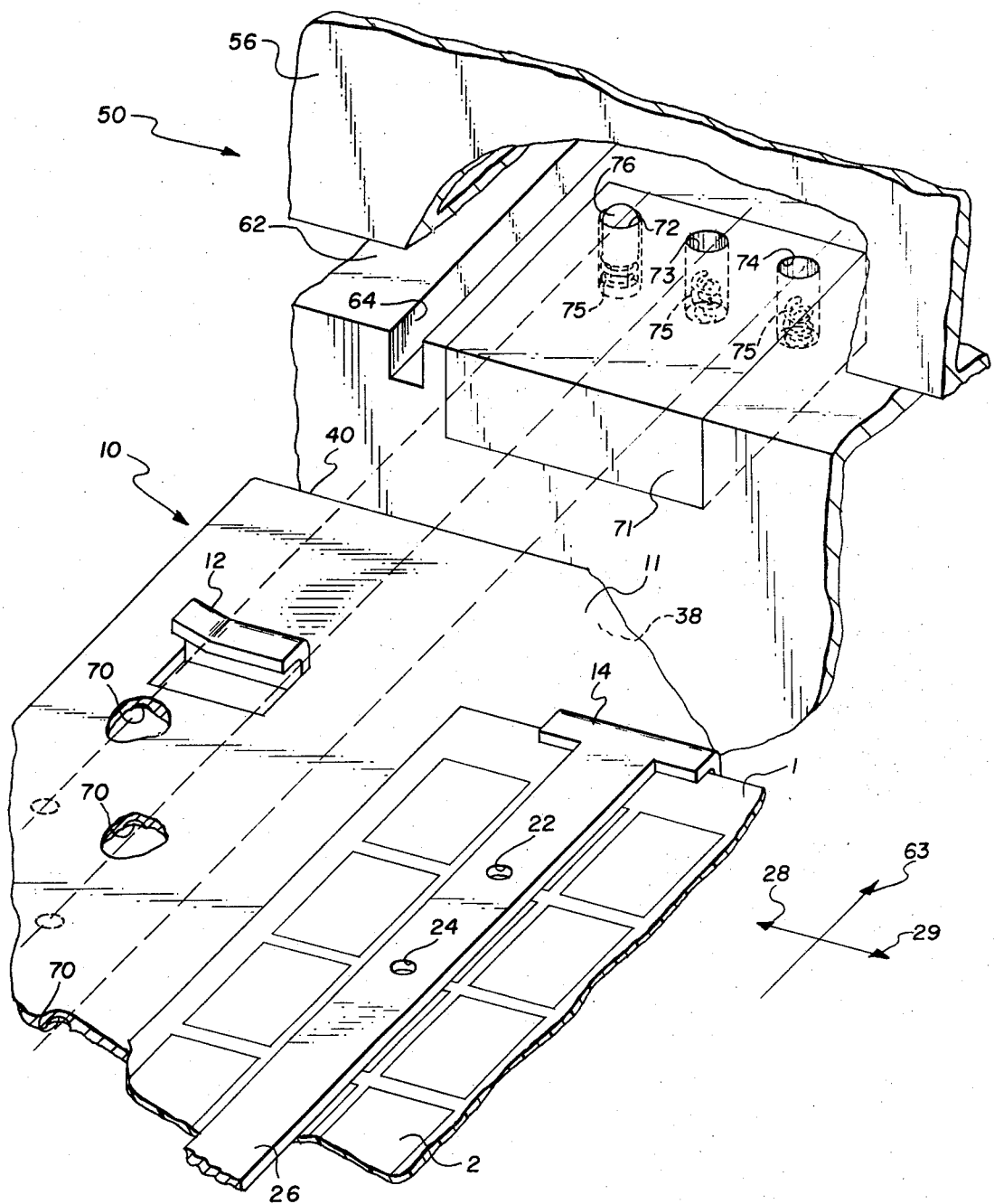
FIG. 6 is a perspective exploded view of portions respectively of the carrier, microform and projector as depicted in FIG. 4, particularly showing a preferred embodiment of indexing means for indicating positions of the carrier within the projector respectively at which selected ones of the rows of images can be projected.

At the inlet 62 of the projector 50 there is provided an insert 71 which, as most clearly shown in FIG. 6, is removably imbedded in the projector housing 56. Such insert includes a plurality of spring-loaded cavities 72, 73 and 74; and, in accordance with the present invention, the number of such cavities is equal to the number of columns of the spaced recesses 70 on the underface 38 of the carrier 10. Each of the cavities has respectively disposed therein a helical compression spring 75 which is biased towards the cavity opening. A plug-like member 76 is selectively insertable into each of the cavities through the respective openings thereof to releasably connect with one of such springs. It can be seen that when the leading edge 40 of the carrier, i.e., the carrier edge which is opposite the carrier handle 39, is inserted in the projector inlet, the columns of recesses will longitudinally extend in the direction designated by the arrow 63. Moreover, such recess-columns will be respectively aligned with the spring-loaded cavities, so that the member 76 may be inserted in any one of such cavities for engagement with the carrier respectively at each of the recesses defining a particular column.

Accordingly, upon insertion of the carrier 10 with the microfiche sheet 1 (or some other multi-image-bearing medium of the type described hereinbefore) in the projector inlet 62, the plug-like member 76 will respectively engage the carrier at successive ones of the recesses 70 within a column thereof each time an image row is selectively positioned between the holes 54 and 55 in the projector housing 56. Stated in other words, each time a row of images on a carrier supported one of the multi-image-bearing mediums is oriented in the projector for projection of respective ones of the images in such row, the member 76 will engage the carrier at one of the recesses defining the column thereof which is indexed to, i.e., equal in recess number to the number of image rows on the supported medium. Therefore, in accordance with the present invention, it can be appreciated how the columns of recesses 70 in combination with the plug-like member 76 act as detent elements for indicating, in response to incremental receipt by the projector 50 of the carrier 10, carrier positions in the projector respectively at which image rows on a carrier supported medium can traverse the light beam emanating from the projector light source 51. Moreover, it will be appreciated that such detent elements, within the broadest aspects of the present invention, can effectively assume configurations and relative orientations other than as illustrated.

Preferably, the carrier 10 is provided on its tab interconnecting member 27 and handle 39 with indicia, generally designated by the reference numeral 77, which furthermore serves to indicate such carrier positions within the projector respectively at which a selected image row of the supported medium may traverse the light beam. As can be seen in FIGS. 1-3, such indicia are arranged in three rows thereof which respectively correspond to the number of image rows on each of the microforms, such as the microfiche sheet 1 and the aperture card 3, discussed hereinbefore. For the purpose of illustration, if the carrier with the microfiche sheet is inserted in the projector to a location wherein the fifth image row counted from the leading carrier edge 40 will traverse the light beam on passage thereof through the carrier aperture 32, then the numeral five in the left-most column of the indicia 77 (FIG. 2) will be positioned just outside of the projector inlet 62.

The operation and utility of the present invention are apparent in large measure from the above description. Within the broadest aspects of such invention, it is to be understood that the number and relative arrangement of the carrier recesses 70 and the insert cavities 72-74 can be varied to accommodate different forms of multi-image-bearing mediums. Moreover, it will be appreciated that while the invention is shown applied to microfilm other mediums are equally suitable.

The present invention has been described in detail with particular reference to a preferred embodiment thereof, but it will be understood that variations and modifications can be effected within the spirit and scope of the invention.

I claim:

1. In apparatus including a projection system defining an image projection path, the improvement comprising, carrier means for carrying image bearing media of the type on which a plurality of projectable images are arranged in rows and columns, said carrier means being adapted to carry image bearing media of such type which differ as to size and/or as to the number of rows of projectable images respectively thereon and/or the size of such images, means located on said carrier for supporting such a medium for selective movement on said carrier means in either of first opposed directions, the first opposed directions extending substantially parallel to rows of images on said supported medium, said supporting means comprising a pair of opposed members which are arranged on said carrier means to respectively support such a medium for individual sliding movement thereof on said carrier means in either of the first opposed directions, at least one of said members being adjustable to any of a plurality of locations on said carrier means, said locations corresponding in number thereof to the number of sizes of medium which may be supported by said carrier, first cooperating means located on said carrier means and said apparatus for supporting said carrier means for selective movement in either of second opposed directions, the second opposed directions extending substantially parallel to columns of images on said supported medium when said carrier means is supported by said first cooperating means, second cooperating means located on said carrier means and said apparatus detenting said carrier means at various carrier means positions on said apparatus, said carrier means positions being ones respectively whereat a different one of said rows of images on said supported medium is aligned to traverse the image projection path of said apparatus when said carrier means is supported by said first cooperating means, said second cooperating means comprising means defining a plurality of spaced recesses in said carrier means, said recesses being arranged in particular groups thereof which respectively correspond in number and pattern of recesses to particular ones of image bearing media of the same type which differ as to the number of rows of projectable images respectively thereon and/or the size of such images, a plurality of stations arranged on said apparatus for respective alignment with said group recesses when said carrier means is supported by said first cooperating means for selective movement in either of the second opposed directions, each of said stations having means respectively defining a spring loaded cavity wherein a spring is biased towards the cavity opening, and a member selectively insertable in each of said cavities through their respective cavity openings to contact one of said springs, said member, when inserted in a cavity, being engageable with said carrier means and respective ones of said recesses within a particular group thereof to detent said carrier means on said apparatus at said various carrier means positions.

2. Apparatus as recited in claim 1, wherein said apparatus is adapted to slidingly receive said carrier means, and in which the improvement further comprises:

indicia means, located on said carrier means and respectively corresponding to said various carrier means positions, for visually indicating a detented row, in response to incremental receipt of said carrier means by said apparatus, when said carrier means is detented on said apparatus at said various carrier means positions.

3. Apparatus as recited in claim 1, in which the improvement further comprises:

means defining an elongated projection aperture in said carrier means, said aperture being of dimensions at least coextensive with a column of images on the largest of image bearing media to be carried by said carrier means and said aperture being arranged in said carrier means for passage of the image projection path through said aperture when said carrier means is detented on said apparatus at said various carrier means positions.

* * * * *